US006982432B2

(12) United States Patent
Umemoto et al.

(10) Patent No.: US 6,982,432 B2
(45) Date of Patent: Jan. 3, 2006

(54) TOUCH TYPE LIQUID-CRYSTAL DISPLAY DEVICE AND INPUT DETECTING METHOD

(75) Inventors: Seiji Umemoto, Osaka (JP); Tomonori Noguchi, Osaka (JP); Tadayuki Kameyama, Osaka (JP); Kiichi Shimodaira, Osaka (JP); Hideo Sugawara, Osaka (JP); Hidehiko Andou, Osaka (JP)

(73) Assignee: Nitto Denko Corporation, Osaka (JP)

( * ) Notice: Subject to any disclaimer, the term of this patent is extended or adjusted under 35 U.S.C. 154(b) by 624 days.

(21) Appl. No.: 09/835,316

(22) Filed: Apr. 17, 2001

(65) Prior Publication Data

US 2001/0022632 A1 Sep. 20, 2001

(30) Foreign Application Priority Data

Apr. 17, 2000 (JP) .......................... P.2000-114817

(51) Int. Cl.
*G02F 1/1335* (2006.01)

(52) U.S. Cl. ........................ 257/12; 257/112; 257/117; 257/118; 257/187; 257/153

(58) Field of Classification Search .................. 349/12, 349/160, 23, 162, 96, 112, 158, 113, 110, 349/111, 73, 74; 345/173, 174, 104; 257/12, 257/112, 117, 118, 153, 187
See application file for complete search history.

(56) References Cited

U.S. PATENT DOCUMENTS

| | | | | | |
|---|---|---|---|---|---|
| 4,916,308 | A * | 4/1990 | Meadows | ................... | 250/221 |
| 5,774,107 | A * | 6/1998 | Inou | ........................... | 345/104 |
| 5,907,375 | A * | 5/1999 | Nishikawa et al. | ........... | 349/12 |
| 5,963,280 | A * | 10/1999 | Okuda et al. | ................. | 349/65 |
| 6,088,024 | A * | 7/2000 | Yamagata | ................... | 345/173 |
| 6,124,919 | A * | 9/2000 | Kubo et al. | ................. | 349/162 |
| 6,181,394 | B1 * | 1/2001 | Sanelle et al. | ................ | 349/96 |
| 6,356,259 | B1 * | 3/2002 | Maeda et al. | ................. | 34/173 |
| 6,411,344 | B2 * | 6/2002 | Fujii et al. | ..................... | 349/12 |
| 6,456,279 | B1 * | 9/2002 | Kubo et al. | ................. | 345/173 |
| 6,483,498 | B1 * | 11/2002 | Colgan et al. | ............. | 345/173 |
| 6,501,528 | B1 * | 12/2002 | Hamada | ..................... | 349/158 |
| 6,501,529 | B1 * | 12/2002 | Kurihara et al. | ............ | 349/160 |
| 6,504,592 | B1 * | 1/2003 | Takatori et al. | ............. | 349/129 |
| 6,507,337 | B1 * | 1/2003 | Sato et al. | .................. | 345/173 |

FOREIGN PATENT DOCUMENTS

| | | | |
|---|---|---|---|
| JP | 3011514 | * | 1/1991 |
| JP | 5-11234 | | 1/1993 |
| JP | 7-104262 | | 4/1995 |
| JP | 8-502837 | | 3/1996 |
| WO | 94/10260 | | 5/1994 |

* cited by examiner

*Primary Examiner*—Nathan J. Flynn
*Assistant Examiner*—Fazli Erdem
(74) *Attorney, Agent, or Firm*—Sughrue Mion, PLLC

(57) ABSTRACT

A touch type liquid-crystal display device has a liquid-crystal display panel having flexibility, a touch panel provided to adhere closely to a back side, opposite to a visual side, of the liquid-crystal display panel, and electrodes disposed to be opposite to each other through a gap. The electrodes are capable of coming into partial contact with each other by a pressing force to thereby detect an input position.

14 Claims, 2 Drawing Sheets

TOUCH TYPE LIQUID-CRYSTAL DISPLAY DEVICE AND INPUT DETECTING METHOD

BACKGROUND OF THE INVENTION

1. Field of the Invention

The present invention relates to an input position detection-style touch type liquid-crystal display device in which viewing blockade based on light reflected by a touch panel is suppressed so that the device is excellent in display quality.

The present application is based on Japanese Patent Applications No. 2000-21310 and 2000-114817, which are incorporated herein by reference.

2. Description of the Related Art

Heretofore, as shown in FIG. 6, a transmission type liquid-crystal display device or a reflection type liquid-crystal display device is known as a touch type liquid-crystal display device equipped with a touch panel for detecting an input position. The transmission type liquid-crystal display device comprises a liquid-crystal display panel 5, and a touch panel 6. The liquid-crystal display panel 5 includes a pair of transparent substrates 52 and 57 provided with transparent electrodes 53 and 56 respectively, a liquid crystal 55 enclosed and sealed by a sealing member 54 between the pair of transparent substrates 52 and 57, and a pair of polarizers 51 and 58 disposed on front and rear surfaces of the pair of transparent substrates 52 and 57 respectively. The touch panel 6 includes a transparent film 61 provided with a transparent electrode 62, a transparent substrate 65 provided with a transparent electrode 64, and a gap adjusting material 63 for forming a gap through which the transparent film 61 and the transparent substrate 65 are disposed so as to be opposite to each other. The touch panel 6 is disposed on a visual side of the liquid-crystal display panel 5. The reflection type liquid-crystal display device is obtained by adding a light reflection layer 59 represented by the virtual line on the back side, opposite to the visual side, of the transmission type liquid-crystal display device. The interposition of the gap is essential to detection of an input position through achievement of partial contact between the transparent electrodes on the basis of pressing.

Increase of the number of interfaces in the arrangement of the touch panel on the visual side, however, brought interfacial reflection of a large amount of external light. This caused glaring light. Hence, there was a problem that contrast of display light in the liquid-crystal display panel was lowered so that display quality was deteriorated. As shown in FIG. 6, particularly reflection $\alpha 3'$ of external light $\alpha 3$ owing to the interface between each of the transparent electrodes 62 and 64 and the gap in the touch panel was so intensive that viewing blockage was intensified by glaring and lowering of contrast of display light $\beta 3$ in the liquid-crystal display panel 5.

Incidentally, in the case of transparent electrodes made of indium-tin oxide, the refractive index difference between each of the transparent electrodes and the gap is not smaller than about 1.0, so that more intensive interfacial reflection than surface reflection owing to the liquid-crystal display panel is generated. In order to prevent such interfacial reflection, a proposal to provide an anti-reflection film on the touch panel has been made. In the current circumstances, however, the anti-reflection effect is so poor that the effect of improving display equality has been never obtained correspondingly to increase in the number of production steps.

SUMMARY OF THE INVENTION

An object of the present invention is to develop a transmission type or reflection type liquid-crystal display device equipped with a touch panel in which glaring or lowering of contrast owing of reflection of external light is so little that the display device is excellent in display quality.

The present invention provides a touch type liquid-crystal display device comprising: a liquid-crystal display panel having flexibility; a touch panel provided to adhere closely to a back side, opposite to a visual side, of the liquid-crystal display panel; and electrodes disposed to be opposite to each other through a gap, the electrodes being capable of coming into partial contact with each other by a pressing force to thereby detect an input position.

According to the present invention, the liquid-crystal display panel having flexibility can be bent by a pressing force to thereby make an input operation in the touch panel. In the condition that external light is attenuated by the liquid-crystal display panel, the external light enters the touch panel or is reflected by the light reflection layer. Hence, there is no or little reflection light generated in the touch panel, so that glaring or lowering of contrast owing to the reflection of external light hardly occurs. Hence, the liquid-crystal display device can be obtained as a transmission type or reflection type liquid-crystal display device equipped with a touch panel excellent in display quality. Incidentally, in the case of a transmission type liquid-crystal display device, light is attenuated by polarizers, a light absorbing layer, etc., in the liquid-crystal display panel so that the quantity of external light entering the touch panel can be generally reduced to be not larger than a half of that in the case of arrangement of the touch panel on the visual side. In the case of a reflection type liquid-crystal display device, external light entering the touch panel can be eliminated and the touch panel need not be made transparent, so that opaque electrodes excellent in forming efficiency, or the like, can be used in the touch panel.

Features and advantages of the invention will be evident from the following detailed description of the preferred embodiments described in conjunction with the attached drawings.

DETAILED DESCRIPTION OF THE PREFERRED EMBODIMENTS

Figure 1:
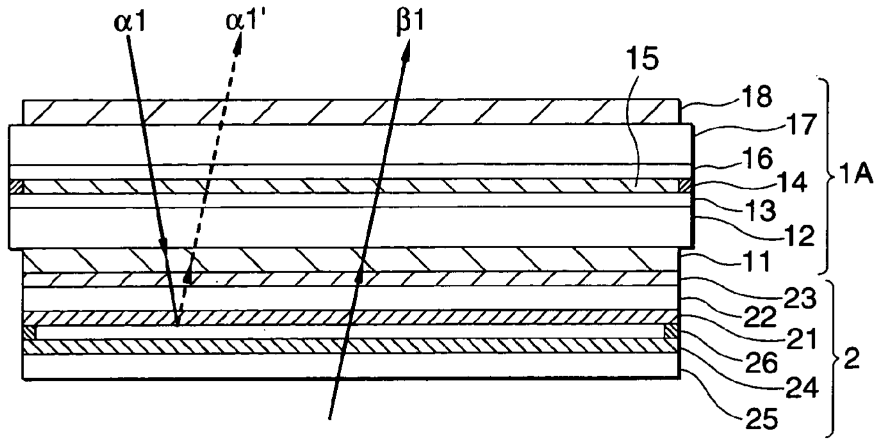
FIG. 1 is a sectional view of an example.

The touch type liquid-crystal display device according to the present invention comprises a touch type liquid-crystal display device comprising: a liquid-crystal display panel having flexibility; a touch panel provided to adhere closely to a back side, opposite to a visual side, of the liquid-crystal display panel; and electrodes disposed to be opposite to each other through a gap, the electrodes being capable of coming into partial contact with each other by a pressing force to thereby detect an input position. FIGS. 1 through 5 show examples of the touch type liquid-crystal display device. Each of the reference numerals 1A, 1B, 1C, 3A and 3B designates a liquid-crystal display panel. Each of the reference numerals 2 and 4 designates a touch panel.

Any suitable form such as a transmission type or a reflection type can be used as the liquid-crystal display panel if the liquid-crystal display panel is so flexible that it can be bent through a pressing force. Incidentally, in an example shown in FIG. 1, the liquid-crystal display panel is constituted by a transmission type liquid-crystal display panel 1A including a pair of transparent substrates 12 and 17 provided with transparent electrodes 13 and 16 respectively, a TN liquid crystal 15 enclosed and sealed by a sealing member 14 between the pair of transparent substrates 12 and 17, and a pair of polarizers 11 and 18 disposed on front and rear surfaces of the pair of transparent substrates 12 and 17 respectively. In an example shown in FIG. 2, the liquid-crystal display panel is constituted by a field effect type liquid-crystal display panel 3A including a colored substrate 31 provided with an electrode 32, a transparent substrate 36 provided with a transparent electrode 35, and a macromolecular dispersion type liquid-crystal layer 34 made of a liquid crystal disposed in a macromolecular matrix and enclosed (33) between the colored substrate 31 and the transparent substrate 36. In an example shown in FIG. 3, the liquid-crystal display device is constituted by a reflection type liquid-crystal display panel 1B obtained by provision of a light reflection layer 19B on the back of the polarizer 11 on the back side, opposite to the visual side, of the liquid-crystal display panel 1A. In an example shown in FIG. 4, the liquid-crystal display device is constituted by a reflection type liquid-crystal display panel 3B obtained by provision of a light reflection layer 38 between the electrode 32 and the transparent substrate 37 on the back side, opposite to the visual side, of the liquid-crystal display panel 3A, and a phase retarder 39 in the inner side of the transparent substrate 36 on the visual side. In addition, in an example shown in FIG. 5, the liquid-crystal display panel is constituted by a liquid-crystal display panel 1C obtained by replacing the light reflection layer 19B of the liquid-crystal display panel 1B with a semi-transmission type reflection layer 19C made of a half mirror.

The liquid-crystal display panel preferably used from a point of view of reducing the influence of external light reflection owing to the touch panel is a macromolecular dispersion type or field effect type liquid-crystal display panel, for example, as described in JP-A-7-104262, JP-A-5-11234, etc., or a liquid-crystal display panel using a cholesteric liquid crystal (chiral nematic liquid crystal) capable of exhibiting characteristic reflection based on a chiral structure, for example, as described in JP-A-8-502837, etc.

That is, in the macromolecular dispersion type or cholesteric liquid crystal type liquid-crystal display panel, display light is formed by scatter reflection or characteristic reflection owing to the liquid-crystal layer, so that a display image can be formed by light which is transmitted through the liquid-crystal layer and which is absorbed to a light absorbing layer, or the like, or by the transmitted light which is reflected by a light reflection layer. As a result, the transmitted light can be absorbed or reflected so that light reaching the touch panel is attenuated or eliminated. Hence, the reflection light generated in the touch panel can be attenuated or eliminated, so that improvement of contrast, or the like, can be attained.

Although the liquid-crystal display panel having flexibility may be formed by use of a glass substrate, a resin substrate is preferably used from a point of view of flexibility, unbreakability, etc. The resin substrate may be made of a suitable resin such as a thermoplastic resin or a curable resin. Incidentally, examples of the resin may include polycarbonate, polyallylate, polyether-sulfone, polyester, polysulfone, triacetyl cellulose, polymethylmethacrylate, polyether-imide, polyamide, polyvinyl chloride, polystyrene, polyether-ether-ketone, epoxy resin, unsaturated polyester, polydiallyl phthalate, polyisobonyl methacrylate, etc.

The thickness of each substrate can be determined suitably in accordance with flexibility, or the like. Generally, the thickness is set to be in a range of from 50 $\mu$m to 1 mm, especially in a range of from 100 to 800 $\mu$m, more especially in a range of from 200 to 500 $\mu$m. At least one substrate on the visual side or on the back side opposite to the visual side may have protrusions in the inner side (liquid-crystal layer side) in order to efficiently transmit bending of the visual side substrate of the liquid-crystal display panel to the back side substrate of the liquid-crystal display panel. Such protrusions may work to retain the cell gap. Incidentally, in the macromolecular dispersion type liquid-crystal layer, the macromolecular matrix may be used as means for transmitting bending.

Figure 2:
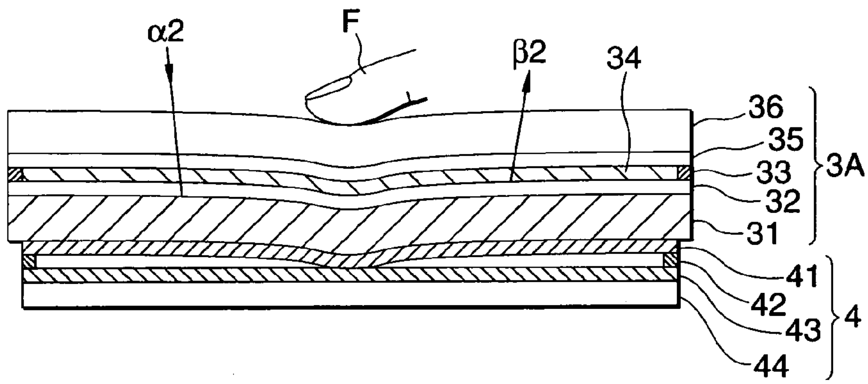
FIG. 2 is a sectional view of another example.
Figure 3:
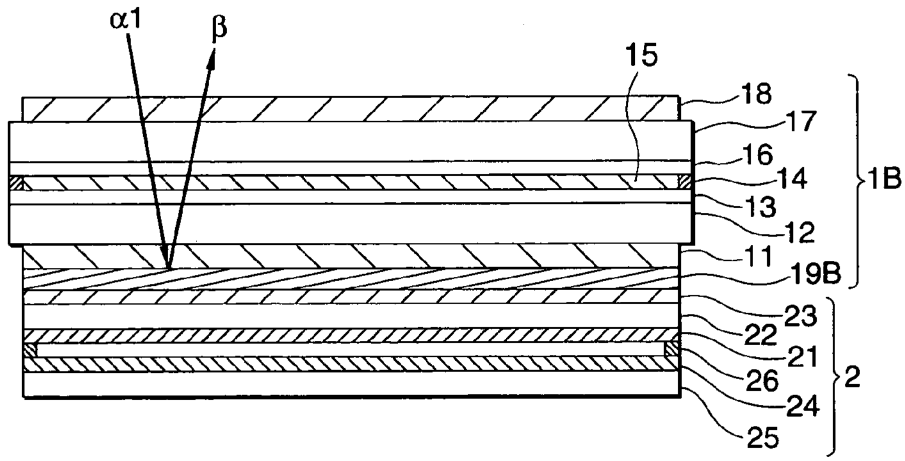
FIG. 3 is a sectional view of a further example.
Figure 4:
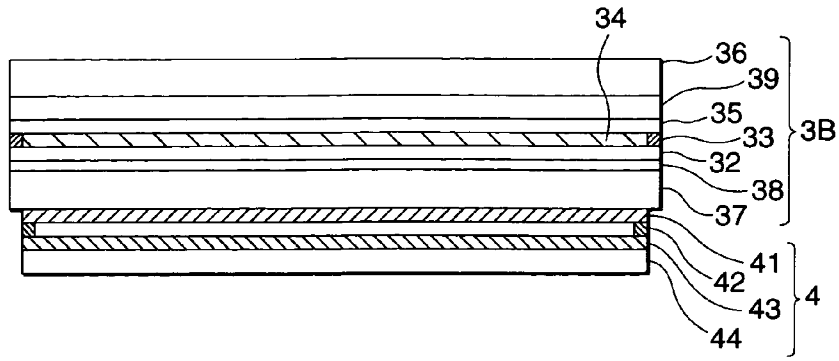
FIG. 4 is a sectional view of a further example.

In the transmission type liquid-crystal display device as shown in FIG. 1, the substrates in the liquid-crystal display panel need to be transparent substrates 12 and 17 in order to ensure transmission of display light β1. On the other hand, in the non-transmission type liquid-crystal display device as shown in FIG. 2 or in the liquid-crystal display device having a light reflection layer 38 in the cell as shown in FIG. 4, the visual-side substrate 36 needs to be transparent in order to ensure transmission of display light β2, or the like, but the touch-panel-side (back-side) substrate 31 or 37 may be transparent or colored as shown in FIG. 2.

The colored substrate can be made from a substrate containing a suitable colorant such as a pigment, a dye, or the like. The colored substrate may serve as a light absorbing layer. When the colored substrate is a light absorption type substrate, separate addition of any light absorbing layer to the non-transmission type liquid-crystal display panel can be omitted. Moreover, deep coloring can be obtained because light absorption through the substrate is started just after image formation in the liquid-crystal layer. Hence, good display easy to view can be achieved. Moreover, in the light absorption type substrate, sufficient light absorption occurs when light is transmitted in the inside of the substrate. Hence, reflection light owing to the touch panel can be attenuated to an ignorable extent. Hence, contrast can be prevented from being lowered.

According to the colored substrate, moreover, foreign matter, or the like, mixed in the substrate can be made inconspicuous. Any measures for preventing the foreign matter, or the like, from being mirrored in display can be made unnecessary. Hence, the substrate can be formed from a material which hardly receives the influence of retardation and which is more excellent in elasticity, strength and heat resistance. Hence, durability of the liquid-crystal display panel can be improved. Incidentally, from the point of view of obtaining deep coloring, the substrate is preferably made from a transparent matrix. In addition, the color of the substrate can be determined suitably without any specific limitation. For example, black may be preferable from a point of view of contrast but the color of the substrate may be made red, blue, or the like.

Also the touch panel disposed on the back side, opposite to the visual side, of the liquid-crystal display panel having flexibility may be formed as a structure in accordance with the background art except that the touch panel is disposed so as to adhere closely to the liquid-crystal display panel without interposition of any gap. That is, the touch panel can be formed as a suitable structure in which electrodes opposite to each other through a gap can be brought into partial contact with each other through a pressing force to thereby detect an input position. Incidentally, in each of the examples of FIGS. 1, 3 and 5, in the touch panel 2, the transparent electrode 21 provided on the transparent film 22 and the transparent electrode 24 provided on the transparent substrate 25 are disposed so that the transparent electrodes 21 and 24 are opposite to each other through a gap of a gap adjusting material 26. The touch panel 2 is bonded onto the back side, opposite to the visual side, of the liquid-crystal display panel 1A, 1B or 1C through an adhesive layer 23. On the other hand, in each of the examples of FIGS. 2 and 4, an electrode 41 is directly provided on the outer side of the colored substrate 31 or transparent substrate 37 on the back side, opposite to the visual side, of the liquid-crystal display panel 3A or 3B and an electrode 43 is provided on a substrate 44. The electrodes 41 and 43 are disposed so as to be opposite to each other through a gap of a gap adjusting material 42 to thereby form the touch panel 4.

In the example shown in FIG. 1, external light α1 is absorbed to and attenuated by the polarizers 18 and 11 of the liquid-crystal display panel 1A and then made enter the touch panel 2. Hence, the quantity of light α1' reflected by the interface between the electrode 21 and the gap is small. Moreover, the reflected light α1' is absorbed to and attenuated by the polarizers again in the return path. As a result, reflection light generated in the touch panel is so little that there is little influence on display light β1. Hence, display excellent in contrast can be obtained. In the example shown in FIG. 3, external light α1 does not reach the touch panel because the external light α1 is reflected by the light reflection layer 19B. Hence, there is no influence on display light β, so that display excellent in contrast can be obtained. In each of the examples shown in FIGS. 2 and 4, external light α2 is absorbed by the colored substrate 31 of the liquid-crystal display panel 3A or reflected by the light reflection layer 38 in the panel 3B, so that light entering the touch panel 4 is substantially eliminated. Hence, reflection light having an influence on display light β2, or the like, is not generated, so that display excellent in contrast can be obtained. Incidentally, in the example shown in FIG. 5, external light transmitted through the semi-transmission type reflection layer 19C may reach the touch panel 4 but the quantity of reflected external light is reduced by the attenuation effect similar to that in the example shown in FIG. 1.

On the other hand, input to the touch panel can be performed as follows. As illustrated in FIG. 2, the liquid-crystal display panel 3A is partially bent through a pressing force F owing to a suitable means such as a finger to thereby achieve partial contact between the electrodes 41 and 43 which are disposed so as to be opposite to each other through a gap in the touch panel 4. A known detection method, such as a resistance changing method, a switching method, or the like, can be used as the method for detecting the input position.

In the aforementioned case, the liquid-crystal display panel and the touch panel can be disposed so as to adhere closely to each other without interposition of any gap to thereby efficiently transmit bending of the liquid-crystal display panel to the touch panel, especially to the liquid-crystal-display-panel-side electrode of the touch panel to prevent input mistakes from occurring. Therefore, the liquid-crystal-display-panel-side electrode in the touch panel or a mechanism for supporting the electrode is preferably excellent in flexibility and easily deformable from a point of view of smooth inputting characteristic, or the like. Such an easily deformable electrode or a mechanism for supporting the electrode can be formed by a suitable method.

A preferable method for providing the easily deformable electrode or the mechanism for supporting the electrode is a method in which the touch-panel-side substrate of the liquid-crystal display panel is made to serve also as a substrate for supporting one electrode in the touch panel. Examples of the method may include: a method in which the electrode 21 is provided on one surface of the film 22 and the other surface of the film 22 is bonded onto the back side, opposite to the visual side, of the touch-panel-side substrate 12 of the liquid-crystal display panel 1A, 1B or 1C through the adhesive layer 23, or the like, so that the electrode 21 faces the outside, that is, the electrode 21 is not provided on the other surface of the film 22 as shown in each of the examples of FIGS. 1, 3 and 5; and a method in which the electrode 41 is directly formed on the touch-panel-side substrate 31 or 37 of the liquid-crystal display panel 3A or 3B as shown in each of the examples of FIGS. 2 and 4.

The aforementioned film method maybe provided as a method in which the film is provided as a film having a light absorbing layer or a light reflection layer on its one surface and an electrode on its other surface so that the film is bonded onto the adhesive layer through the light absorbing layer side or light reflection layer side. This method can be applied to a non-transmission type liquid-crystal display device as illustrated in FIG. 2 and to a reflection type liquid-crystal display device as illustrated in each of FIGS. 3 to 5. A colored substrate can be used as a substitute for the transparent substrate or the transparent substrate is used in combination with the colored substrate. When the touch-panel-side substrate of the liquid-crystal display panel is configured to have a light absorbing layer, an advantage similar to that in use of the colored substrate can be fulfilled. On the other hand, in the case of a light reflection layer, there can be used a method in which the film is provided as a film having a light reflection layer and an electrode on its one surface while the film is bonded onto the adhesive layer on its other surface having no electrode. In this case, the light reflection layer is provided between the electrode and the film.

The electrode on the back side, opposite to the visual side, of the touch panel may be directly attached to a suitable substrate such as a glass substrate or a resin substrate, or the like, similarly to the liquid-crystal-display-panel-side electrode. Alternatively, an electrode may be provided on a film so that the electrode is provided in the form of the film. Alternatively, the film may be bonded onto a substrate so that the electrode is provided in the form of the substrate. That is, the back-side electrode of the touch panel can be provided by a suitable method without any specific limitation. The back-side electrode is preferably configured to be supported by a substrate excellent in elastic coefficient from a point of view of current conduction based on smooth contact between electrodes through a pressing force.

Figure 5:
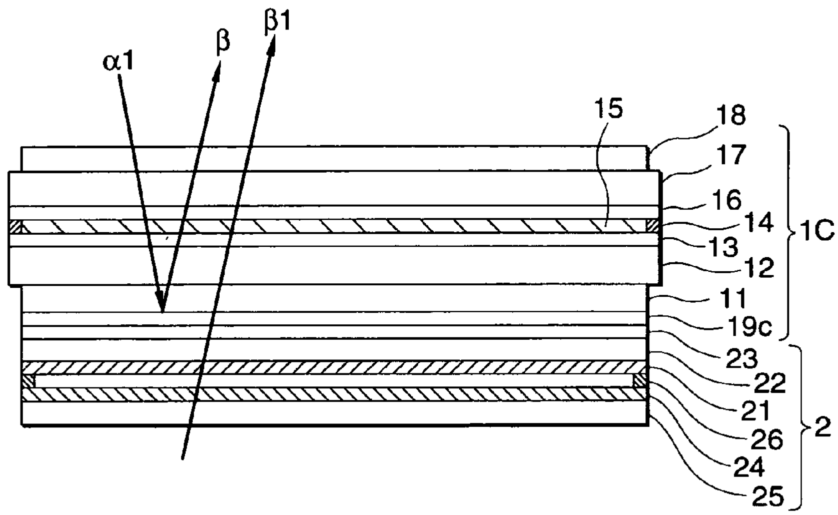
FIG. 5 is a sectional view of a further example.
Figure 6:
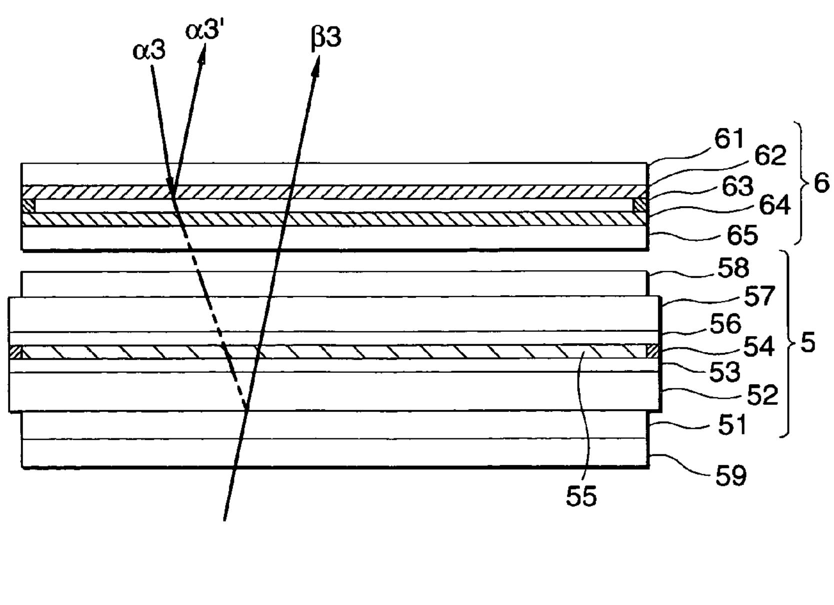
FIG. 6 is a sectional view of a background-art example.

In the above description, each of the electrodes provided in the touch panel needs to be a transparent electrode similarly to the electrodes disposed on opposite sides of the liquid-crystal layer in the liquid-crystal display panel in the case where the liquid-crystal display device is a transmission type liquid crystal display device as shown in FIG. 1 or a semi-transmission type liquid-crystal display device as shown in FIG. 5. In addition, the touch panel needs to be a transparent touch panel inclusive of the mechanism for supporting the electrode. On the other hand, when the liquid-crystal display device is a non-transmission type liquid-crystal display device as illustrated in FIG. 2 or a reflection type liquid-crystal display device as illustrated in each of FIGS. 3 and 4, the electrode may be a transparent electrode or an opaque electrode. In addition, the touch panel may be formed as an opaque touch panel inclusive of the mechanism for supporting the electrode.

A suitable electrically conductive material in proportion to the background-art material can be used for forming such a transparent electrode or opaque electrode without any specific limitation. An electrode forming method similar to the background-art method can be used without any specific limitation. Incidentally, examples of the method may include: a method in which an electrically conductive material of metal oxide such as indium oxide, tin oxide, titanium oxide, cadmium oxide or a mixture thereof, an electrically conductive material of metal such as gold-silver, platinum-palladium, copper-aluminum, nickel-chromium, titanium-iron, cobalt-tin, or an alloy thereof, or an electrically conductive material of another metal compound such as copper iodide is attached onto a support such as a substrate or a film by a suitable thin-film-forming method such as a vacuum vapor deposition method, a sputtering method, an ion-plating method, a spray thermal decomposition method, a chemical plating method, an electric plating method or a combination method thereof; and a method in which an electrically conductive coating composition is applied onto the aforementioned support. An electrode made of a coating layer of a resin containing electrically conductive powder such as carbon powder is superior in production efficiency to the transparent electrode. Moreover, when electrically conductive characteristic is given to a high elastic body, the high elastic body can be preferably used as a touch panel substrate serving also as an electrode from a point of view of easily inputting characteristic (deformability), durability, etc.

Incidentally, when such an electrode is to be attached to the support, a suitable pre-treatment such as a corona treatment, an ultraviolet-ray treatment, a plasma treatment, a sputter-etching treatment or an undercoat treatment may be applied onto the surface of the support in order to improve adherence between the support and the electrode layer. A suitable material such as an acrylic resin, an urethane-acrylic resin, an epoxy resin or a hydrolytic condensation polymer of metal alkoxide may be used in the undercoat treatment and may contain a filler such as silica particles or alumina particles.

In the above description, the light absorbing layer or light reflection layer provided in the touch-panel-side substrate of the liquid-crystal display panel can be provided in a suitable position of the inner or outer side of the touch-panel-side substrate. The light reflection layer 38 may be formed as a light reflection layer serving also as an electrode 32 when the light reflection layer 38 is provided in the inner side of the touch-panel-side substrate 37 so that the liquid-crystal display panel has the light reflection layer in the cell, as illustrated in FIG. 4.

The light absorbing layer or light reflection layer can be made of a suitable material similar to the background-art material. The light absorbing layer or light reflection layer may be formed as a layer attached to a supporting substrate, or the like, by a suitable method such as a coating method or a vapor deposition method. The light absorbing layer or light reflection layer may be formed as a film integrated with a light absorbing/reflection means such as a film containing a light absorbing/reflection material such as a back sheet or a white sheet.

Incidentally, the light reflection layer may be formed as a semi-transmission type reflection layer 19C made of a half mirror, or the like, as shown in FIG. 5. In this case, the liquid-crystal display device may be provided as a touch type liquid-crystal display device having an illuminator on the back side, opposite to the visual side, of the touch panel so that the touch type liquid-crystal display device can be used both in a reflection mode using external light and in a transmission mode using a back-lighting system. The semi-transmission type light reflection layer can be formed suitably from a material similar to that in the background art, such as a multi-layer film of a dielectric, a coating film of a flake dielectric, a light-transmissible and light-reflective metal thin film, a porous high-reflectivity metal film, etc., without any specific limitation in kind. Although FIG. 5 illustrates the case where a semi-transmission type light reflection layer is provided in the outside of the liquid-crystal cell, the present invention may be applied also to the case where such a semi-transmission type light reflection layer is provided in the inside of the cell as shown in FIG. 4.

As described above, the touch type liquid-crystal display device according to the present invention comprises a liquid-crystal display panel having flexibility, and a touch panel provided on a back side, opposite to a visual side, of the liquid-crystal display panel, the touch panel including a pair of electrodes opposite to each other through a gap, the touch panel capable of being bent partially through a pressing force to bring the pair of electrodes into partial contact with each other to thereby detect the pressed position. Hence, the touch type liquid-crystal display device can be formed in the same manner as in the background art without any specific limitation except that the touch panel is disposed on the back side, opposite to the visual side, of the flexible liquid-crystal display panel without interposition of any gap so that input to the touch panel can be made through pressing and deforming the liquid-crystal display panel.

Hence, each of the liquid-crystal display panel and the touch panel can be formed as a suitable form and a lead electrode for connection to an external circuit, or the like, can be provided in the same manner as in the background art. Moreover, a hard coat layer of a resin such as an acrylic resin, a silicone resin, an epoxy resin, or the like, can be attached onto the touch surface, or the like, of the liquid-crystal display panel as occasion demands. The surface of the hard coat layer may be provided as a non-glare surface of a fine irregularity structure, or the like.

EXAMPLE 1

Two planished plates were disposed and fixed into a mold through a spacer with a predetermined thickness. An alicyclic epoxy resin was injected into the mold and cured at 120° C. for 2 hours thus to form a resin plate 100 $\mu$m thick. The resin plate was cut into a predetermined size. Then, a plasma treatment was applied to the resin plate in an atmosphere of argon and a transparent electrode of indium-tin oxide (ITO) was formed on the resin plate by a sputtering method. Then, a polyvinyl alcohol solution was applied onto the resin plate with the transparent electrode by a spin coating method and a rubbing treatment was applied to the resulting dried film. Thus, a transparent resin substrate was obtained.

Then, two transparent resin substrates, one of which was obtained in the aforementioned manner and the other of which was obtained in the aforementioned manner except that the transparent electrode was further divided into two parts by etching, were disposed to be opposite to each other through the electrode side so that the rubbing directions of the transparent resin substrates intersect each other perpendicularly while a gap adjusting material was disposed. Then, a TN liquid crystal (ZLI-4792, made by MERCK & Co., Ltd.) was injected between the two transparent resin substrates to form a liquid-crystal cell. Polarizers (NPF HEG1425DUAG30GARS, made by Nitto Denko Corporation) subjected to an anti-reflection treatment and an anti-glare treatment respectively were bonded to front and back, opposite surfaces of the liquid-crystal cell through adhesive layers so that an anti-reflection layer was located in the outer side. Thus, a normally white transmission type liquid-crystal display panel was obtained.

Then, a transparent electrically conductive film made of a combination of a silver-paste-printed ITO film and a polyester film was bonded onto the back-side polarizer of the liquid-crystal display panel through an adhesive layer so that the ITO film side was located in the outer side. On the other hand, a transparent electrically conductive film formed in the same manner as described above was bonded onto a glass plate through an adhesive layer. The two transparent electrically conductive films were bonded to each other through a gap adjusting material so that the ITO films in the two transparent electrically conductive films face each other to form a touch panel. Thus, a touch type liquid-crystal display device was obtained.

EXAMPLE 2

A transparent resin substrate was formed in the same manner as in Example 1. An ITO film was formed on one surface of the transparent resin substrate. On the other hand, a black substrate was formed as a mixture of a black pigment, and ITO films were formed on opposite surfaces of the black substrate. A rubbing treatment was applied to each of the two substrates. The two substrates were disposed to be opposite to each other through the electrode side so that the rubbing directions intersect each other perpendicularly while a gap adjusting material of spherical glass beads was disposed. Then, the two substrates were fixed by a sealing material. Incidentally, the transparent electrode in one of the two substrates was divided into two parts by etching in advance.

Then, a mixture of 10 parts by weight of trimethylpropane acrylate, 10 parts by weight of 2-hydroxyethyl acrylate, 25 parts by weight of acryl oligomer (M-1200, made by Toa Gosei Chemical Industry Co., Ltd.), 0.5 parts by weight of photo-setting initiator (DAROCUR 1173, made by MERCK & CO., Ltd.) and 50 parts by weight of liquid crystal (E7, made by BDH) was injected between the two substrates and irradiated with ultraviolet rays from the transparent resin substrate side to there by form a macromolecular dispersion type liquid-crystal layer. An anti-reflection film was bonded onto the transparent-resin-substrate-side surface of the liquid-crystal cell through an adhesive layer so that the anti-reflection layer was located in the outer side. Thus, a non-transmission type liquid-crystal display panel was obtained.

Then, silver paste was printed on the ITO film disposed in the outer side of the black substrate. On the other hand, a transparent electrically conductive film made of a combination of a polyester film and an ITO film was bonded onto a glass plate through an adhesive layer so that the ITO film side was located in the outer side. The two substrates were bonded to each other through a gap adjusting material so that the respective ITO films of the two substrates face each other to thereby form a touch panel. Thus, a touch type liquid-crystal display device was obtained.

EXAMPLE 3

A normally white reflection type liquid-crystal display panel was obtained in the same manner as in Example 1 except that the polarizer provided on the back side opposite to the visual side was replaced by a polarizer (NPF HEG1425DU, made by Nitto Denko Corporation) having a plastic film of a surface irregularity structure and a light reflection sheet which is coated with aluminum by vapor deposition and which is bonded to the plastic film. A touch panel was provided to the reflection type liquid-crystal display panel to thereby obtain a touch type liquid-crystal display device. Hence, the light reflection sheet was positioned between the touch panel and the liquid-crystal cell.

EXAMPLE 4

A liquid-crystal cell was obtained in the same manner as in Example 1 except that the ITO film provided on one surface of the transparent resin substrate disposed on the back side opposite to the visual side was replaced by a light reflection layer of an aluminum-sputtering film serving also as an electrode, except that the light reflection layer was divided into two parts, except that an ITO film for touch panel was formed on the other surface of the substrate, except that the substrate was fixed to a counter substrate by a sealing material through a gap adjusting material of spherical glass beads so that the rubbing direction of the rubbing film in the counter electrode was parallel, and except that the aforementioned TN liquid-crystal (ZLI-4792) was enclosed between the two substrates to form a field effect type liquid crystal.

Then, a quarter-wave plate and an anti-reflection treatment type polarizer (NPF HEG1425DUAG30GARS) were bonded onto the visual side of the liquid-crystal cell through a light scatter type fine-particles-containing adhesive layer (haze: 83%) so that the anti-reflection layer was located in the outer side. Thus, a reflection type liquid-crystal display panel was obtained. On the other hand, a silver-paste-printed polyester film was bonded to a glass plate through an adhesive layer to there by form a substrate. The substrate was disposed, through an adhesive layer, on the ITO film provided in the transparent resin substrate disposed on the back side, opposite to the visual side, of the reflection type liquid-crystal display panel so that the silver paste electrodes face each other to thereby form a touch panel. Thus, a touch type liquid-crystal display device was obtained. Incidentally, the quarter-wave plate in the liquid-crystal cell was disposed so that the drawing axis of the quarter-wave plate intersects the rubbing direction of the cell perpendicularly and makes a crossing angle of 40° with respect to the absorbing axis of the polarizer.

EXAMPLE 5

A reflection type liquid-crystal display panel equipped with a touch panel was obtained in the same manner as in Example 3 except that the polarizer having a light reflection sheet bonded was replaced by a polarizer (F4205P1, made by Nitto Denko Corporation) having a semi-transmission type reflection sheet bonded. Aback-lighting unit (Color Illuminator, made by Fuji Photo Film Co., Ltd.) was disposed on the back side, opposite to the visual side, of the touch panel. Thus, a touch type liquid-crystal display device was obtained.

COMPARATIVE EXAMPLE 1

A transparent electrically conductive film made of a combination of a silver-paste-printed ITO film and a polyester film was bonded onto a glass plate through an adhesive layer so that the ITO film side was located in the outer side. Thus, a substrate was prepared. On the other hand, a transparent electrically conductive film was prepared in the same manner as described above. The substrate and the transparent electrically conductive film were bonded to each other through a gap adjusting material so that the respective ITO films face each other. Thus, a touch panel was formed. Then, the touch panel was disposed on the visual side of a normally white liquid-crystal display panel formed in the same manner as in Example 1. Thus, a touch type liquid-crystal display device was obtained.

COMPARATIVE EXAMPLE 2

A touch type liquid-crystal display device was obtained in the same manner as in Comparative Example 1 except that the touch panel was disposed on the back side, opposite to the visual side, of the liquid-crystal display panel through a spacer having a thickness of 0.5 mm.

COMPARATIVE EXAMPLE 3

A touch type liquid-crystal display device was obtained in the same manner as in Comparative Example 1 except that a liquid-crystal display panel formed in the same manner as in Example 2 was used.

COMPARATIVE EXAMPLE 4

A touch type liquid-crystal display device was obtained in the same manner as in Comparative Example 1 except that a reflection type liquid-crystal display panel formed in the same manner as in Example 3 was used.

COMPARATIVE EXAMPLE 5

A touch type liquid-crystal display device was obtained in the same manner as in Comparative Example 2 except that a reflection type liquid-crystal display panel formed in the same manner as in Example 3 was used.

COMPARATIVE EXAMPLE 6

A touch type liquid-crystal display device was obtained in the same manner as in Comparative Example 1 except that a reflection type liquid-crystal display panel formed in the same manner as in Example 4 was used.

Evaluation Test 1

The transmission type touch type liquid-crystal display device obtained in each of Example 1 and Comparative Examples 1 and 2 was disposed on a light table. In a dark room, a fluorescent lamp was disposed in an upper position distanced by 1 m from the device to there by form external light illumination. In the condition that a voltage was applied to one of the divided two parts of the electrodes so that a white portion and a black portion were displayed half by half, the state of display of the liquid-crystal display device was observed and evaluated. As a result, reflection owing to the touch panel in Example 1 was so little that the reflection was observed only in frontal reflection, that is, the surface reflection of the touch panel in Example 1 was little. The surface reflection of the touch panel in Example 1 was substantially equivalent to that of a liquid-crystal display device after removal of the visual side touch panel in Comparative Example 1. That is, in Example 1, black-and-white display was observed very clearly, so that a good display state was obtained. Incidentally, frontal contrast in the dark room was 30:1.

On the contrary, in Comparative Example 1, the intensity of an image of the fluorescent lamp mirrored in the touch panel disposed on the visual side was large, especially remarkable in a neighbor of regular reflection. The light reflected by the touch panel remarkably disturbed the black display in particular, so that the black display could be hardly viewed. Even in the case where the viewing point was shifted from the direction of regular reflection, it was very hard to view the black display because the observer's face, or the like, was mirrored in the touch panel. Incidentally, in Comparative Example 2, a substantially good display state was obtained though surface reflection in Comparative Example 2 was slightly intensive compared with that in Example 1.

Evaluation Test 2

On the other hand, the non-transmission type touch type liquid-crystal display device obtained in each of Example 2 and Comparative Example 3 was put in a dark room. In the dark room, a fluorescent lamp was disposed in an upper position distanced by 1 m from the device to thereby form external light illumination. In the condition that a voltage was applied to one of the divided two parts of the electrode so that a white portion and a black portion were displayed half by half, the state of display of the liquid-crystal display device was observed and evaluated. As a result, in Example 2, the touch panel was hidden by the black substrate so that the reflected light could not be viewed. Even in regular reflection, there was no reflected light but light reflected by the anti-reflection film on the surface of the liquid-crystal display panel. Hence, in Example 2, very good display quality was obtained. In Comparative Example 3, it was, however, hard to view display because of light reflected by the touch panel similarly to Comparative Example 1.

Evaluation Test 3

The visual-side surface of the touch type liquid-crystal display device obtained in each of Examples 1 and 2 and Comparative Examples 1 to 3 was pressed by a finger to thereby examine the switching function. As a result, the switching function was detected without any problem in each of Examples 1 and 2 and Comparative Examples 1 and 3. In Example 1, the switching function was good though a pressing force more intensive than that in Example 2 was required because the touch panel in Example 1 was firm against the pressing force. Even in the case where pressing was repeated 100 times, there was no switching error in Example 1. On the contrary, in Comparative Example 2, not only an intensive pressing force was required but also there were 39 times of switching error when pressing was repeated 100 times. It was conceived that the pressing force was transmitted efficiently if the liquid-crystal display panel and the touch panel were disposed so as to adhere closely to each other as represented by Examples 1 to 2, whereas contact error occurred easily between the electrodes of the touch panel if a gap was interposed between the liquid-crystal display panel and the touch panel as represented by Comparative Example 2.

Evaluation Test 4

The reflection type touch type liquid-crystal display device obtained in each of Examples 3 to 5 and Comparative Examples 4 to 6 was put in a dark room. In the dark room, a fluorescent lamp was disposed in a position upward distanced by 1 m from the device and inclined by 20 degrees to the frontal direction to thereby form external light illumination. In the condition that a voltage was applied to one of the divided two parts of the electrode so that a white portion and a black portion were displayed half by half, the state of display of the liquid-crystal display device was observed and evaluated. As a result, in respective Examples 3 to 5 and Comparative Example 5, surface reflection owing to the touch panel was not viewed at all in an ordinary state. Especially in Example 3, the black-and-white display was observed very clearly, so that remarkably excellent display quality was obtained. Incidentally, frontal contrast in the dark room was 12:1 in Example 3, 10:1 in Example 4 and 9:1 in Example 5. In Example 5, contrast of 15:1 was achieved even in a transmission mode in which external light illumination was switched off and the back-lighting system was switched on. In each of Examples 3 and 4, the touch panel was hidden by the light reflection layer so that surface reflection was not viewed. In each of Examples 3 and 4, good display quality was obtained because no reflected light but light reflected by the anti-reflection film on the front surface of the penal was viewed even in regular reflection.

On the contrary, in each of Comparative Examples 4 to 6, the intensity of an image of the fluorescent lamp mirrored in the touch panel disposed on the visual side was large, especially remarkable in a neighbor of regular reflection. The light reflected by the touch panel remarkably disturbed the black display in particular, so that the black display could be hardly viewed. Even in the case where the viewing point was shifted from the direction of regular reflection, it was very hard to view the black display because the observer's face, or the like, was mirrored in the touch panel. Incidentally, in any one of Comparative Examples 4 to 6, in the condition that the visual-side touch panel was removed, surface reflection was substantially equivalent to that of the liquid-crystal display panel in each of Examples 3 to 5, so that the black-and-white display was observed very clearly and a good display state was obtained.

Evaluation Test 5

The visual-side surface of the touch type liquid-crystal display device obtained in each of Examples 3 to 5 and Comparative Examples 4 to 6 was pressed by a finger to thereby examine the switching function. As a result, the switching function was detected without any problem in each of Examples 3 to 5 and Comparative Examples 4 and 6. In each of Examples 3 and 5, the switching function was good though a pressing force more intensive than that in Example 4 was required because the touch panel in Example 3 or 5 was firm against the pressing force. Even in the case where pressing was repeated 100 times, there was no switching error in Example 3 or 5. On the contrary, in Comparative Example 5, not only the panel was required to be bent largely by an intensive pressing force but also there were 39 times of switching error when pressing was repeated 100 times. It was conceived that the pressing force on the surface of the touch panel was transmitted efficiently to bring one substrate into contact with the lower substrate securely to thereby achieve the switching function because the touch-panel-side substrate of the liquid-crystal display panel served also as one substrate of the touch panel as represented by Examples 3 to 5, whereas contact error occurred easily between the electrodes of the touch panel when a gap was interposed between the liquid-crystal display panel and the touch panel as represented by Comparative Example 5.

As described above in Examples 1 to 5, according to the present invention, a touch panel is disposed so as to adhere closely to a back side, opposite to a visual side, of any flexible liquid-crystal display panel such as a transmission type liquid-crystal display panel or a reflection type liquid-crystal display panel. Preferably, the touch panel is provided so as to serve also as a substrate. Hence, surface reflection owing to the touch panel is prevented or suppressed greatly while sure input detection is achieved. Hence, a touch type liquid-crystal display device with good display quality can be obtained even in an atmosphere of external light.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A touch type liquid-crystal display device comprising:

a liquid-crystal display panel having flexibility; and a touch panel disposed on a back side, opposite to a visual side, of said liquid-crystal display panel, wherein said touch panel comprises at least a first pair of electrodes disposed to be opposite to each and separated by a gap, said first pair of electrodes being adapted for coming into partial contact with each other by a pressing force to thereby detect an input position, and wherein said liquid-crystal display panel comprises a second pair of electrodes and a colored substrate provided on a touch panel side of said second pair of electrodes, and said first pair of electrodes are disposed on a back side, opposite to a visual side, of said colored substrate.

2. A touch type liquid-crystal display device according to claim 1, wherein said liquid-crystal display panel comprises a light absorbing layer or a light reflection layer.

3. A touch type liquid-crystal display device according to claim 2, wherein said light reflection layer is located at a visual side or a back side of said colored substrate of said liquid-crystal display panel.

4. A touch type liquid-crystal display device according to claim 1, wherein said touch panel further comprises a film interposed between one of said first pair of electrodes and said liquid-crystal display panel.

5. A touch type liquid-crystal display device according to claim 4, wherein said film has said light absorbing layer on said other surface on which no electrode is provided or said film has said light reflection layer in an inner side of said one of said first pair of electrodes provided on an electrode-side surface of said film.

6. A touch type liquid-crystal display device according to claim 2, wherein said light reflection layer serves also as one of said second pair of electrodes of said liquid-crystal display panel.

7. A touch type liquid-crystal display device according to claim 2, wherein said light reflection layer is made of a film for forming a light reflection means.

8. A touch type liquid-crystal display device according to claim 2, further comprising an illuminator disposed on a back side, opposite to a visual side, of said touch panel, wherein said light reflection layer is of a semi-transmission type.

9. A touch type liquid-crystal display device according to claim 1, wherein said liquid-crystal display panel comprises a substrate made of a resin.

10. A touch type liquid-crystal display device according to claim 1, wherein said liquid-crystal display panel comprises a macromolecular dispersion type liquid-crystal display panel.

11. A touch type liquid-crystal display device according to claim 1, wherein said liquid-crystal display panel comprises a cholesteric liquid crystal.

12. A touch type liquid-crystal display device according to claim 1, wherein said liquid-crystal display panel comprises at least one substrate having a protrusion.

13. A touch type liquid-crystal display device according to claim 1, wherein said liquid-crystal display panel comprises a substrate which serves also as a substrate for supporting one of said first pair of electrodes in said touch panel.

14. An input detecting method comprising steps of:

disposing a touch panel comprising at least a first pair of electrodes opposite to each other through a gap on a back side, opposite to a visual side, of a liquid-crystal display panel, wherein said liquid-crystal display panel comprises a second pair of electrodes and a colored substrate provided on a touch panel side of said second pair of electrodes, and said first pair of electrodes are disposed on a back side, opposite to a visual side, of said colored substrate; and partially bending said liquid-crystal display panel by a pressing force to bring said first pair of electrodes of said touch panel into partial contact with each other to thereby detect a position of said pressing force.

* * * * *